No. 797,844. PATENTED AUG. 22, 1905.
W. W. DOOLITTLE.
METHOD OF MAKING FLANGES.
APPLICATION FILED OCT. 9, 1903.
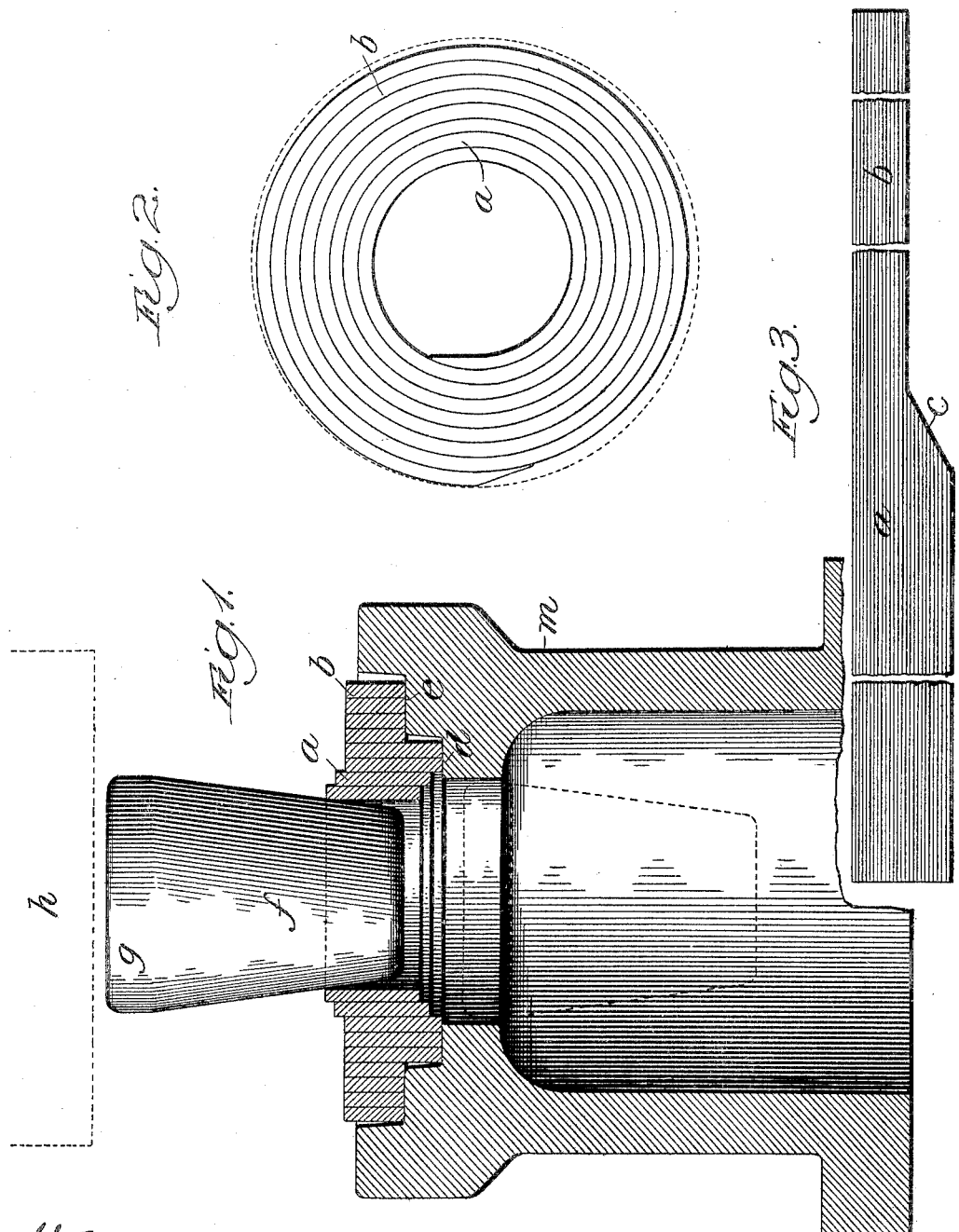
Witnesses:
Paul Carpenter
F. W. H. Clay
Inventor:
William W. Doolittle,
By Paul Synnestvedt
Atty.

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

METHOD OF MAKING FLANGES.

No. 797,844.  Specification of Letters Patent.  Patented Aug. 22, 1905.

Application filed October 9, 1903. Serial No. 176,377.

*To all whom it may concern:*

Be it known that I, WILLIAM W. DOOLITTLE, a citizen of the United States, residing at Chicago, in the State of Illinois, have invented a certain new and useful Method of Making Flanges, of which the following is a specification.

My invention relates to the flanges placed on pipes or tubes for attaching several lengths of the same together, and particularly to methods for making the same of a superior form of forged metal. The objects of the invention are to provide a flange having great circumferential strength to withstand the pressure of attaching tubes in the same, and of the liquid pressure; to provide a method of making flanges out of bar or plate metal, and to provide for welding the strips of metal together and forging the entire flange in one operation of the plunger and hammer, and to generally improve the quality and cheapen the construction of pipe flanges and facilitate the making of the same. These objects, together with other advantages which will hereinafter appear, I attain by means of the procedure as hereinafter described and illustrated in the accompanying drawings, in which—

Figure 1 is a vertical central sectional view through the flange and die, showing the flange in the process of being forged.

Figure 2 is a plan view of the material for the flange as rolled up in the form of a coil of plate metal.

Figure 3 is a broken plan of the metal blank used for rolling up the coil of Figure 2 and for making the flange as in Figure 1.

For use in positions where a cast flange is not sufficiently strong, it has been customary to use a forged flange made by the ordinary process of forging but this is very expensive and the operation of forging is very difficult. A flange is not only easily made by use of a coil, but the flange is of very much greater circumferential strength than one forged by the older methods. In carrying out my process I first provide a strip of plate metal in the form of a long strip as indicated at Figure 3, which will be of varying dimensions and varying length according to the size and shape of flange to be made. It is provided with a wide portion $a$ which is calculated to be sufficient to form the heavy body part of the flange and with a narrow portion $b$ for the flange proper extending outside of the wide portion as shown in Figure 1. By any convenient means I wind the strip of metal into a helical coil as shown in Figure 2, leaving a few of the inside turns raised or displaced in the direction of the axis of the coil as shown in Figure 1; whereupon it is heated to welding heat and placed in the die $m$ which is made with two annular seating surfaces $d$ and $e$ formed of the general contour the flange is desired to be, the opening in the center of the same being sufficient to allow of the plunger die $f$ to pass its cylindrical portion $g$ entirely through to the position shown in dotted lines. The plunger $f$, $g$, having been brought down to a position flush with the top of the die $m$, thus compressing the metal and flattening the top side displacing the inner turns in the direction of the axis of the flange, and thoroughly welding the parts into one solid piece, the plunger $f$ is then driven entirely through as by a hammer or another die plunger in order to make the interior diameter of the flange the proper shape and size, when the flange is lifted out of the place and the plunger $f$ afterward removed from the die $m$.

It will be understood that by this method the laminations of the coil ($a$, $b$,) are thoroughly pressed and welded together and made of the exact shape desired to be given to the flange, while any superfluous material that may be present will be forced through as the plunger $f$, $g$, passes through the interior opening of the die $m$. When the presser die $h$ comes in contact with the top of the coil, the raised inner turns of the part $a$ will press downward, sliding them on the contiguous surfaces, which roughens or striates the surfaces closely knitting the parts together and making a superior weld. The plunger $g$ may be pushed on through by another tool, after the die $h$ has flattened the top surface of the flange, or, of course a punch working through a hole in the presser block $h$ might be used to push the plunger through while $h$ remains in contact. The result is a pipe flange which is of accurate form and has very superior strength in a circumferential direction to resist the pressures, and is also in a condition to be readily worked and turned to form the necessary grooves inside the flange. Other advantages of this method and of the article will readily occur to those familiar with the art.

Having thus described my invention and illustrated its use, what I claim as new, and desire to secure by Letters Patent, is the following:

1. The method of making pipe flanges consisting in coiling a sheet of plate metal in a mold and then heating and forcing through the center of the coil a taper-shaped plug to compress the layers of the metal, substantially as described.

2. The method of making pipe flanges which consists in winding a strip of plate metal into a helical coil with an open center, heating and placing the same into a properly shaped die and forcing a plunger through the center portion to weld the laminations together, substantially as described.

3. The method of making a welded pipe flange which consists in providing a coil of sheet or plate metal, placing the same in a die and driving in the center of the same a taper plug and simultaneously pressing the top of the metal down flat, and then driving the plug clear through the flange, substantially as described.

In testimony whereof I have hereunder signed my name in the presence of the two subscribed witnesses.

WILLIAM W. DOOLITTLE.

Witnesses:
PAUL CARPENTER,
EDWARD C. BURNS.